(12) United States Patent  (10) Patent No.: US 8,810,865 B2
Suzuki  (45) Date of Patent: Aug. 19, 2014

(54) IMAGE PROCESSING METHOD, PROGRAM, AND IMAGE PROCESSING APPARATUS FOR DETECTING AN AREA OF OBJECT AND INCLINATION OF THE AREA WITH RESPECT TO A PLATEN IMAGE

(75) Inventor: Nobukazu Suzuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 332 days.

(21) Appl. No.: 13/179,435

(22) Filed: Jul. 8, 2011

(65) Prior Publication Data

US 2012/0013953 A1    Jan. 19, 2012

(30) Foreign Application Priority Data

Jul. 16, 2010   (JP) ................................. 2010-162097

(51) Int. Cl.
*H04N 1/40*  (2006.01)
*G06K 9/36*  (2006.01)
*G03G 15/00*  (2006.01)

(52) U.S. Cl.
USPC ............ 358/448; 358/1.9; 358/1.2; 358/3.12; 358/449; 382/289; 399/376

(58) Field of Classification Search
CPC ....... H04N 1/40; H04N 1/00; H04N 1/00018; H04N 1/00135; H04N 1/00241; H04N 1/00474; H04N 1/00586; H04N 1/00588; H04N 1/00737; H04N 3/1562; H04N 5/23274; G06T 2207/10008; G06K 7/1096; G06K 15/1219
See application file for complete search history.

(56) References Cited

U.S. PATENT DOCUMENTS 6,360,026 B1 *  3/2002  Kulkarni et al. ............... 382/289
6,433,896 B1 *  8/2002  Ueda et al. ..................... 358/488
7,206,104 B2 *  4/2007  Lee ................................ 358/488
7,321,687 B2 *  1/2008  Yamamoto .................... 382/170

* cited by examiner

*Primary Examiner* — Steven Kau (74) *Attorney, Agent, or Firm* — Canon USA, Inc. IP Division (57) ABSTRACT

A method for image processing in which an area of a platen on which a document is placed is read and the platen image is processed includes extracting an object included in the platen image, detecting an area of the object and inclination of the area of the object with respect to the platen image, determining the minimum rectangular area which includes the area of the object, and is surrounded with four sides parallel to four sides of the platen image respectively, comparing an extent to which a pixel group constituting an edge of each area includes pixels constituting an edge of the platen image between the area of the object and the minimum rectangular area, and determining a minimum rectangular area as the area of the document if a pixel group includes a larger number of pixels based on the comparing or if the inclination is small.

19 Claims, 8 Drawing Sheets

R1: IMAGE READING APPARATUS

IMAGE PROCESSING METHOD, PROGRAM, AND IMAGE PROCESSING APPARATUS FOR DETECTING AN AREA OF OBJECT AND INCLINATION OF THE AREA WITH RESPECT TO A PLATEN IMAGE

BACKGROUND OF THE INVENTION

1. Field of the Invention

The present invention relates to an image processing method in which a document placed on an image reading apparatus is read to output an image in the area of the document.

2. Description of the Related Art

Conventionally, an apparatus has been known which reads a document placed on a platen of an image reading apparatus to identify the position and size of the document from the read image data. Further, an apparatus has been known which detects an inclination angle of a document from information about an edge of the document included in the read image data to correct the inclination by processing according to the inclination angle of the document.

However, the image of the inclined document cannot be corrected by merely identifying the position and size of the document. If the inclination angle is detected, the correction of inclination of the image of the document may be corrected correspondingly to the detected angle. The processing for correcting the inclined document has an issue that the load is large and it takes much time to process.

SUMMARY OF THE INVENTION

According to an aspect of the present invention, a method for image processing in which an area of a platen on which a document is placed is read and the platen image is processed includes extracting an object included in the platen image, detecting an area of the object and inclination of the area of the object with respect to the platen image, determining a minimum rectangular area which includes the area of the object, and is surrounded with four sides parallel to four sides of the platen image respectively, comparing an extent to which a pixel group constituting an edge of each area includes pixels constituting an edge of the platen image between the area of the object and the minimum rectangular area, and determining the minimum rectangular area as the area of the document if a pixel group includes a larger number of pixels based on the comparing or if the inclination is small.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
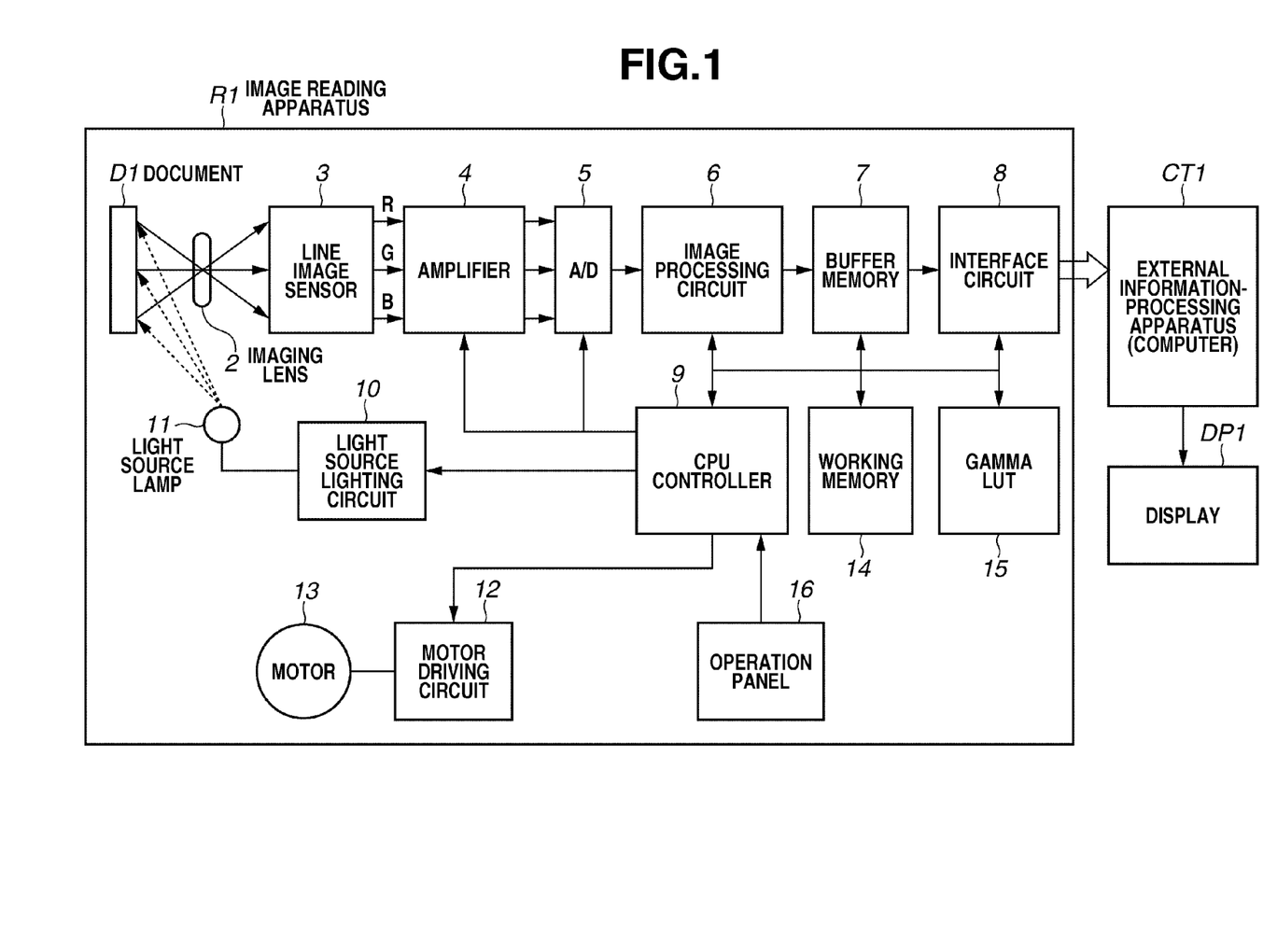
FIG. 1 illustrates a hardware configuration of an image reading apparatus according to an exemplary embodiment of the present invention.

FIG. 1 illustrates a configuration of an image reading apparatus R1 according to a first exemplary embodiment of the present invention. The image reading apparatus R1 includes a line image sensor 3, an amplifier 4, an analog-to-digital (A/D) converter 5, an image processing circuit 6, a buffer memory 7, an interface circuit 8, and a central processing unit (CPU) controller 9. The image reading apparatus R1 further includes a light source lighting circuit 10, a light source lamp 11, a motor driving circuit 12, an optical system driving motor 13, a working memory 14, and a gamma look up table (LUT) 15.

The line image sensor 3 outputs an analog image signal. The amplifier 4 amplifies the analog image signal output by the line image sensor 3. The A/D converter 5 converts the analog image signal output by the amplifier 4 into a digital image signal. The image processing circuit 6 subjects the digitized image signal to image processing such as offset correction, shading correction, digital gain adjustment, color balance adjustment, color masking conversion, and resolution conversion in the main- and sub-scanning directions.

The buffer memory 7 includes a random access memory (RAM) and temporarily stores image data. The interface circuit 8 mediates a command or image communication with an external information processing apparatus CT1 and uses interfaces such as a small computer system interface (SCSI), a parallel interface, a universal serial bus (USB), an Institute of Electrical and Electronic Engineers (IEEE) 1394 interface, a local area network (LAN), and a wireless LAN. The image data read by the image reading apparatus R1 is transmitted to the external information processing apparatus CT1 and subjected to image processing.

The CPU controller 9 controls the image reading apparatus R1 according to a command from the external information processing apparatus CT1 to control the motor driving circuit 12, the light source lighting circuit 10, and the image processing circuit 6. The CPU controller 9 detects a state where a switch provided on an operation panel 16 is pressed and notifies the external information processing apparatus CT1 thereof via the interface. The external information processing apparatus CT1 may be a host computer such as a personal computer and connected to a monitor display DP1.

The light source lighting circuit 10 drives and lights the light source lamp 11. The light source lamp 11 illuminates a document D1 and a reflected light whose intensity varies according to the density of a document surface forms an image on the line image sensor 3, that is a solid-state image sensor, via an imaging lens 2. The motor driving circuit 12 drives the optical system driving motor 13 such as a step motor and outputs an excitation signal for the optical system driving motor 13 according to a control signal from the CPU controller 9 serving as a system control unit of the image reading apparatus R1.

The working memory 14 is used as a temporary working memory when the image processing circuit performs an image processing. The working memory 14 is used to correct offset among red, green, and blue (RGB) lines of the image signal received from each line sensor for RGB arranged in parallel with a predetermined offset provided. Further, the working memory 14 temporarily stores various types of data such as shading correction. The gamma LUT 15 stores a density gamma conversion LUT to perform the gamma correction.

Figure 2:
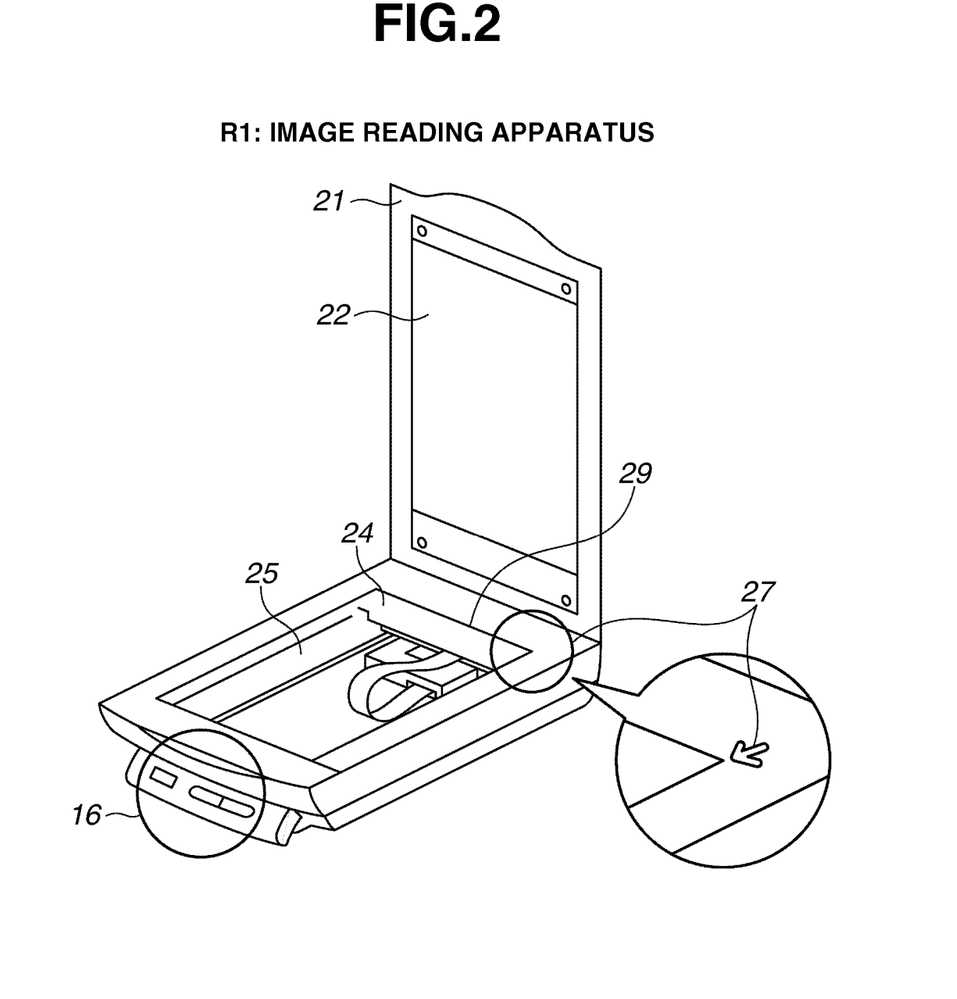
FIG. 2 illustrates an external view of the image reading apparatus according to the exemplary embodiment.

FIG. 2 illustrates an example of external view of the image reading apparatus R1 according to the first exemplary embodiment. The image reading apparatus R1 includes a document pressing plate 21, a white sheet 22, a reading optical system unit 24, a transparent platen (document positioning plate) 25, and an operation panel 16. The image reading apparatus R1 also includes a mark 27 indicating an abutting position required for placing a document. The document pressing plate 21 stably presses the document to the platen 25.

The white sheet 22 brings a thin document into close contact with the platen 25 and whitens image data of a margin portion of the document. The platen 25 maintains a reading surface of the document flat and holds the document. The operation panel 16 is used to transmit a simple instruction such as a reading start to the external information processing apparatus CT1 serving as an image data transmission destination. The abutting position mark 27 indicates a document reference position and a position from which reading of the document placed on the platen 25 is started.

Processing for acquiring a document area by the computer of the external information processing apparatus CT1 based on the platen image acquired by the image reading apparatus R1 reading the document placed on the platen 25 is described below.

Figure 3:
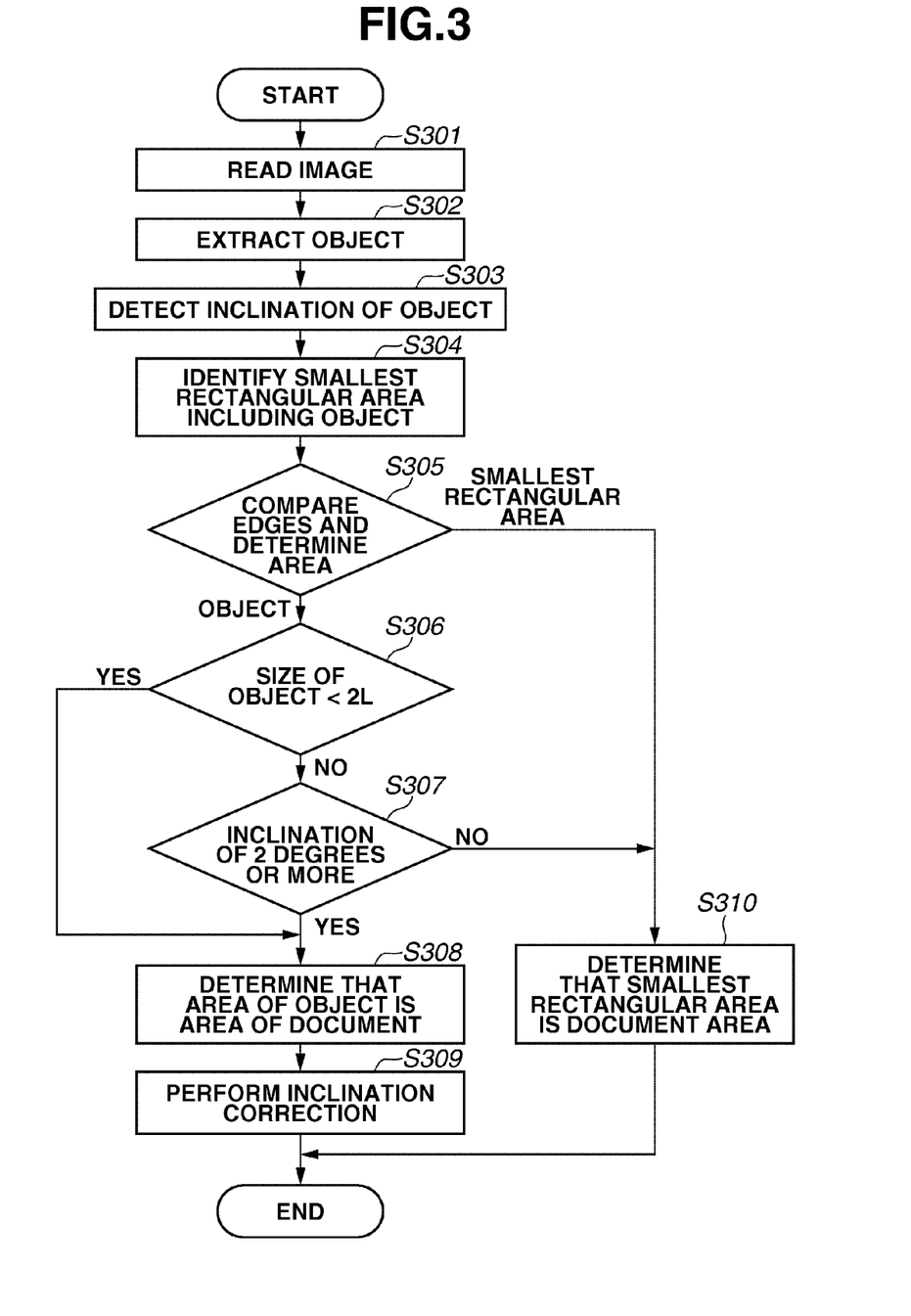
FIG. 3 is a flow chart illustrating an image reading method according to the exemplary embodiment.

FIG. 3 is a flow chart illustrating the processing for acquiring the document area based on the platen image read by the image reading apparatus R1. In step S301, the image reading apparatus R1 reads the image on the platen 25 on which the document is placed as the platen image. At this point, reading resolution may be low resolution for pre-scanning or high resolution for actual scanning.

Figure 5A:
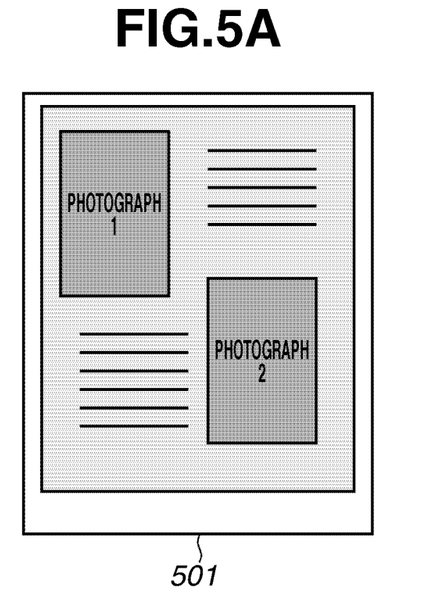
FIGS. 5A to 5D illustrate images which a platen is read according to the exemplary embodiment.
Figure 5B:
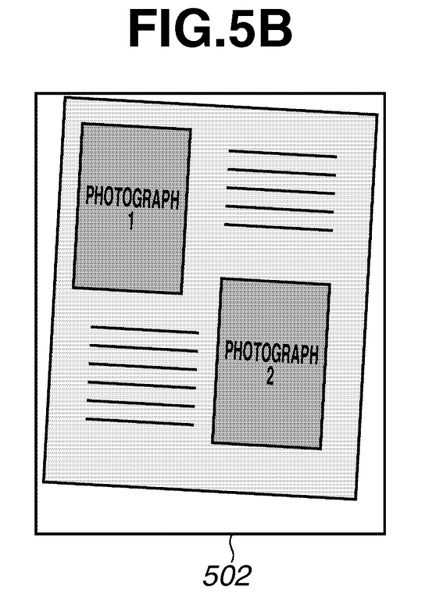
Figure 5C:
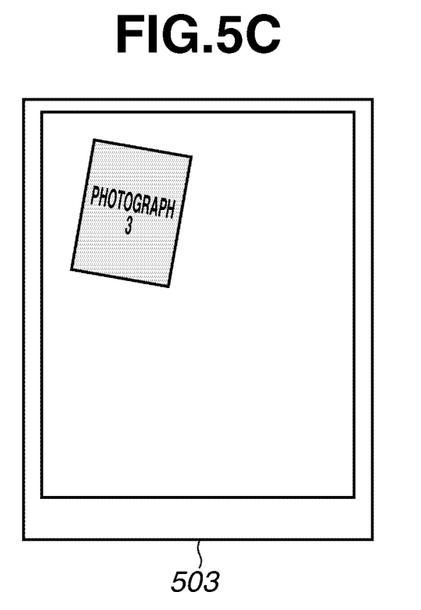
Figure 5D:
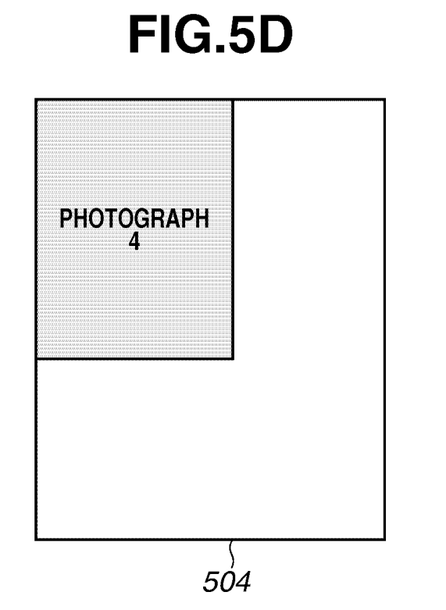
Figure 6A:
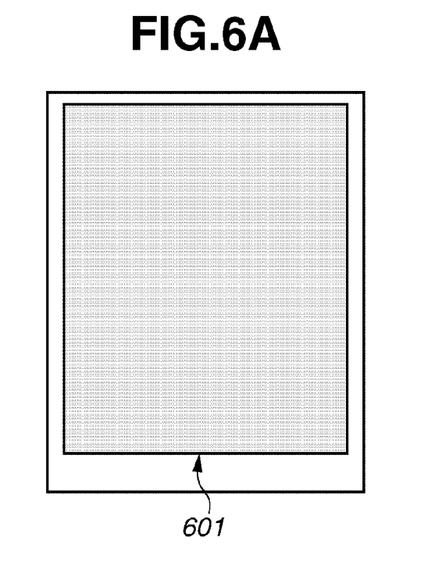
FIGS. 6A to 6D illustrate images, which an object is extracted according to the exemplary embodiment.
Figure 6B:
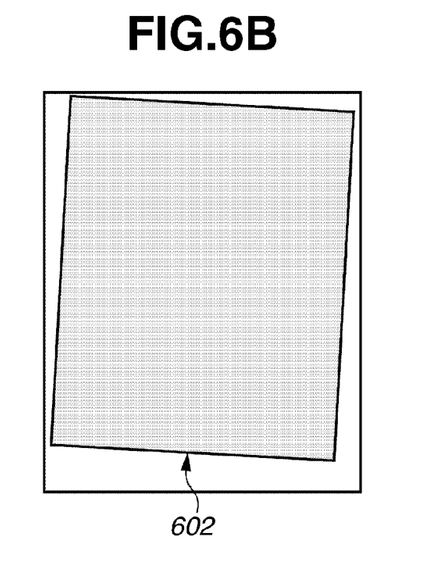
Figure 6C:
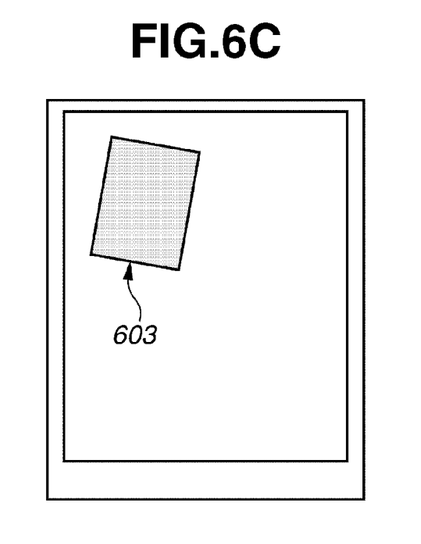
Figure 6D:
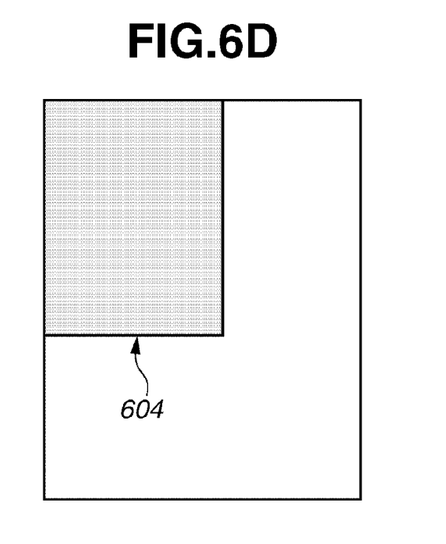
Figure 7A:
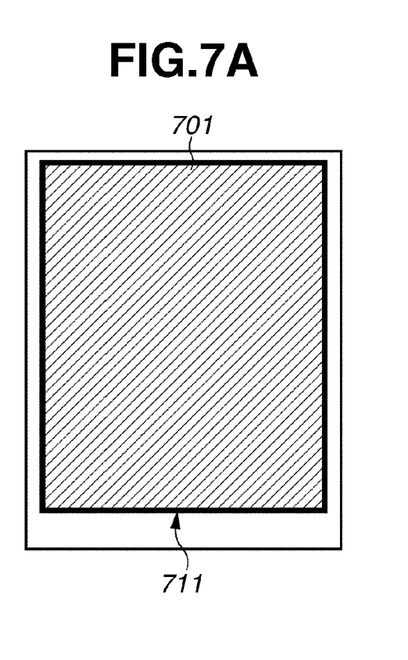
FIGS. 7A to 7D illustrate areas of objects and the minimum rectangles according to the exemplary embodiment.
Figure 7B:
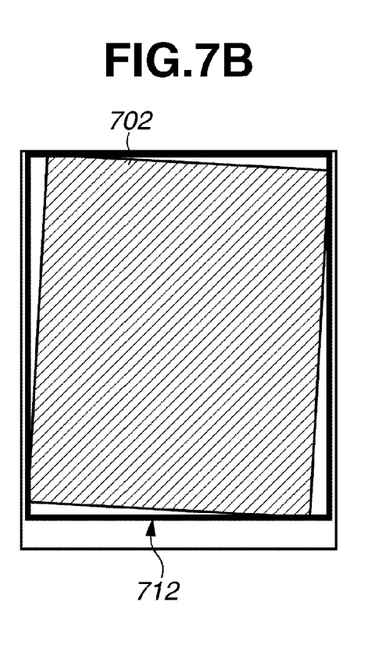
Figure 7C:
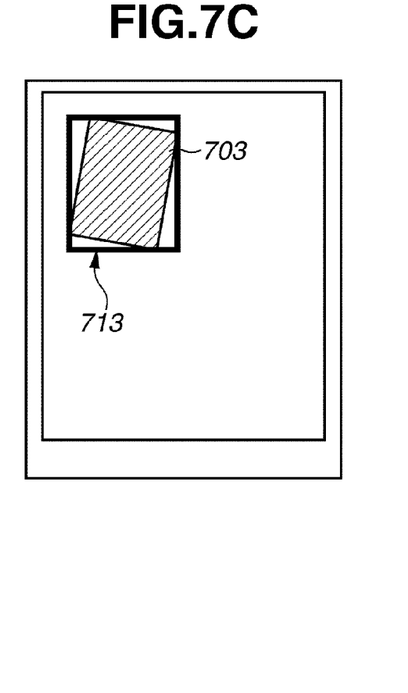
Figure 7D:
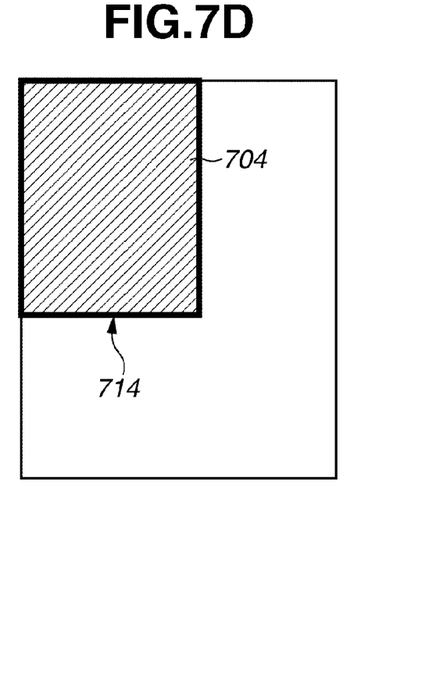

FIGS. 5A to 5D illustrate examples of read images. An image 501 illustrated in FIG. 5A is the one that a page is clipped out of a magazine including photographs and articles and read. An image 502 illustrated in FIG. 5B is the one that a platen on which the same document as that in FIG. 5A is placed slightly obliquely is read. An image 503 illustrated in FIG. 5C is the one that a platen on which a photograph smaller than a 2 L sized photograph is placed obliquely is read. An image 504 illustrated in FIG. 5D is the one that a platen on which a single large photo document is placed is read. The document pressing plate 21 in white is read in the portion around each document.

In step S302, an object is extracted from the platen image. An extraction method is illustrated in the flow chart in FIG. 4. In step S401, a threshold value for binarization is determined from the image. The threshold value can be appropriately determined from the analysis of luminance level or density level of pixel of the platen image or a fixed value is previously determined as the threshold value. In step S402, the image is binarized based on the threshold value determined in step S401.

Figure 4:
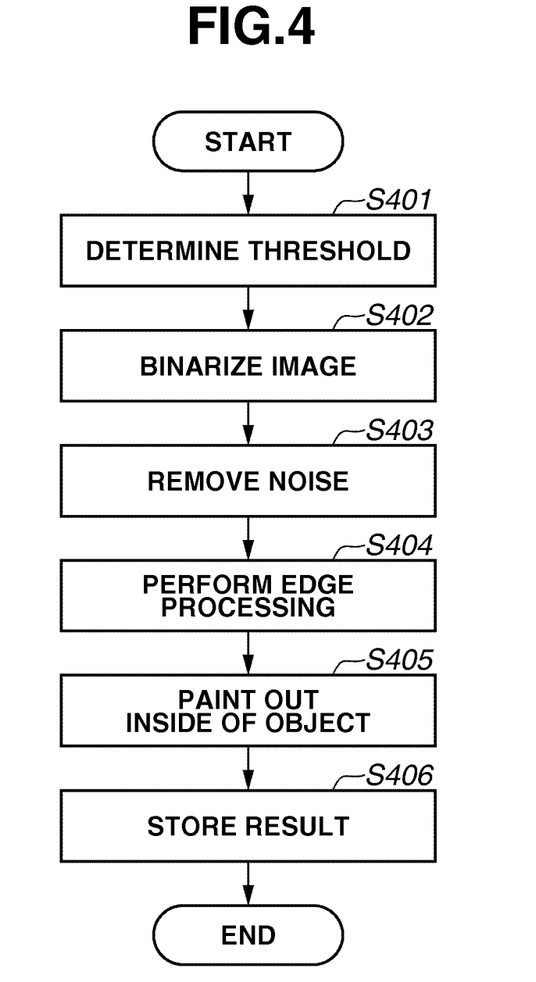
FIG. 4 is a flow chart illustrating extraction of an object from an image according to the exemplary embodiment.

In step S403, a noise appeared as an isolated point is removed from the image binarized in step S402. The pixel whitened by the binarization in step S402 is removed from the object. In removing a noise, the pixel blackened by the binarization is subjected to a labeling process. The pixel in which the number of pixels with the same label is equal to or smaller than a certain size, e.g., one pixel or fewer is also removed from the object.

When a noise is removed in step S403, in the case of a single paper document whose white degree is particularly high, the edge portion of the document may be not continuous due to the result of the binarization. Thus, in step S404, the continuity of a black pixel is studied to perform processing to include the edge portion in the object.

In step S405, the inside of the object is painted out. The binarized black pixel from which a noise is removed is determined as the object until step S404. A shape of an area of the black pixel determined as the object is examined. If a completely different object is included in an object, the inside of the object is completely painted out in black as the object. For example, when a photograph is scanned, if the background portion of the photograph is bright and only an outer periphery portion and the object of the photograph are turned into black pixels by the binarization, the photograph is painted out in black in its entirety.

In step S406, the result is stored. Since there are only two types of the result, either an object or a non-object, in step S406, the result is coded with 1 as an object and 0 as a non-object and stored. In the binarization results in step S402 and the subsequent steps, coding is performed with black as 1 and white as 0, so that the binarization results may be directly used. FIGS. 6A to 6D illustrate the result of extraction of the object in step S302 with images 601, 602, 603, and 604 painted out in black.

In step S303, the inclination of the area of the extracted object with respect to the platen image is detected. A circumscribed rectangle that is circumscribed by the extracted object is formed. The circumscribed rectangle is rotated to determine a rectangle and an inclination in a rotation position in which the area of the circumscribed rectangle is minimized. The circumscribed rectangle is rotated to the left and right directions by 45 degrees at maximum to determine an angle at which the area is minimized. Hereinafter, the circumscribed rectangle whose area is minimized is taken as the area of the object and the rotation angle thereof is taken as the inclination of the object.

The striped areas 701, 702, 703, and 704 in FIGS. 7A to 7D indicate the areas of the objects corresponding to those illustrated in FIGS. 5A to 5D and FIGS. 6A to 6D. The area 701 is little inclined. The area 702 is inclined rightward by about two degrees. The area 703 is inclined rightward by 15 degrees. The area 704 is not inclined.

In step S304, there is identified a rectangle that includes the area of the extracted object and whose four sides are parallel to the four sides of the platen image respectively and area is minimal. The rectangle can be obtained such that each side of the platen image is sequentially moved from outside to inside and stopped at a position where each side overlaps with the edge of the object. Each of thick lines 711, 712, 713, and 714 in FIGS. 7A to 7D shows the rectangle whose four sides are parallel to the four sides of the platen image respectively and area is minimal and which includes the document. Hereinafter, those rectangles are referred to as the minimum rectangular.

In step S304, the edge is compared and the area is determined. The number of pixels on the outermost periphery of the striped areas 701, 702, 703, and 704 which are the areas of the objects determined in step S303 and include the edges of the platen images (in FIGS. 5A to 5D) acquired in step S301 is calculated. The edge of the platen image refers to a pixel in which a difference in luminance value between each pixel of the platen image and a pixel adjacent thereto is equal to or greater than a predetermined value. For the sake of simplicity, if it is focused on a pixel on the outermost periphery in the area of the object, a difference in luminance value between the focused pixel and a pixel adjacent outside the area of the object is acquired.

The difference is acquired by focusing on all pixels (a pixel group) on the outermost periphery in the area of the object, and a histogram is generated using the absolute value of the difference. Then, the number of pixels on the outermost periphery of the minimum rectangular areas 711, 712, 713, and 714 acquired in step S304 that include the edges of the platen images acquired in step S301 is calculated. A histogram is generated in a similar manner that the area of the object is calculated.

Figure 8A:
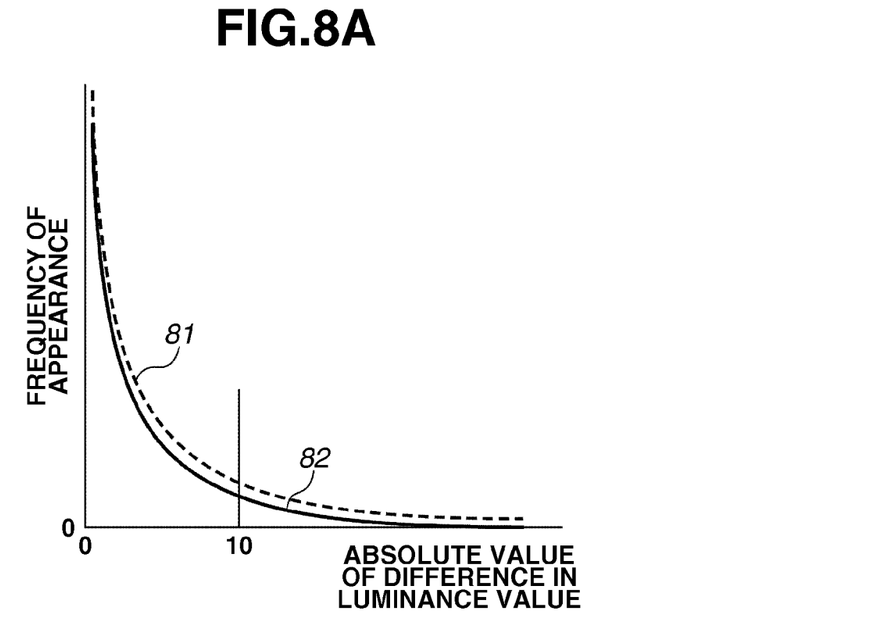
FIGS. 8A and 8B illustrate histograms of pixels in a pixel group constituting an edge according to the exemplary embodiment.
Figure 8B:
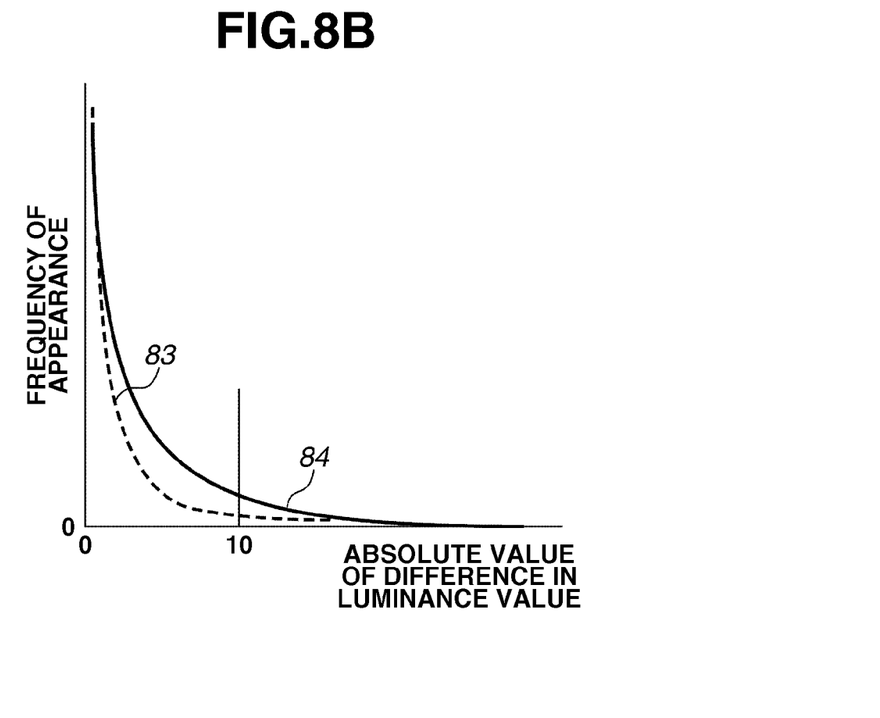

FIGS. 8A and 8B are examples of histograms. FIGS. 8A and 8B illustrate cases where the images on the documents in FIGS. 5A and 5B are processed respectively. Dotted lines 81 and 83 indicate the edges of the minimum rectangles 711 and 712 respectively. Solid lines 82 and 84 indicate the edges of the areas 701 and 702 of objects respectively.

The document, that is a page of a magazine, has no printing on a portion near the periphery and the background color of a whitish sheet is directly read. For this reason, a difference in luminance value between the white of the document pressing plate 21 as a background and the portion near the periphery of the read document is small. The major portion of difference in luminance value can be acquired from a shadowy image at the edge caused by the thickness of the document. The rectangle that includes many pixels at the shadowy portion seems to be the edge of a correct document.

In a case where the document is little inclined in FIG. 5A, there is little difference between the histograms 81 and 82 as illustrated in FIG. 8A. However, the minimum rectangle 711 can more correctly express the periphery of the document than the striped area 701 depending on the errors in the extraction of the object and the detection of the object area. In such a case, as illustrated in FIG. 8A, the edge 81 becomes higher in the frequency of appearance.

For the sake of simple comparison, the frequency of appearance is compared at a difference in luminance of 10. In step S310, the edge 81 is higher in the frequency of appearance, so that the minimum rectangle 711 which includes the area of the object and whose four sides are parallel to the four sides of the platen image respectively and area is minimal is determined as the area of the document.

In a case where the document is slightly inclined in FIG. 5B, a difference is produced between the histograms as illustrated in FIG. 8B. The pixel having a difference in luminance value appears infrequently in the histogram 83 of the outer periphery of the rectangle 712. This is because almost all of peripheral portions of the rectangle 712 are the image in which the document pressing plate 21 is read. Only a small portion near four vertexes of the area 702 of the object out of the periphery portion of the rectangle 712 is an image in which the shadow of the edge caused by the thickness of the document is read.

When the frequency of appearance is compared at the difference in luminance of 10, the edge 84 is higher in the frequency of appearance, so that the area 702 of the object is temporarily determined as the area of the document in FIG. 8B.

In step S305, if the area of the document is temporarily determined as the area 702 of the object (OBJECT in step S305), then in step S306, the size of the object is checked. Since it is difficult to correctly arrange the angle of a small document, the document is liable to be arranged obliquely. If the size of the object is smaller than 2 L size of a photograph, the area of the object is determined as the area of the document.

If the size of the object is equal to or larger than 2 L size (NO in step S306), in step S307, the inclination of area of the object is determined. The inclination of the object is already obtained in step S303. If the inclination is smaller than two degrees (NO in step S307), in step S310, the rectangle which includes the area of the object and whose four sides are parallel to the four sides of the platen image respectively and area is minimal is determined as the area of the document.

If the inclination of the object is equal to or greater than two degrees (YES in step S307), in step S308, the area of the object is determined as the area of the document. If the inclination is less than two degrees, no problem lies in visibility. Therefore, if the inclination is less than two degrees, inclination correction is not performed so as not to take processing time more than needs.

In step S308, if the area of the object is determined as the area of the document, then in step S309, the inclination of the image in the area of the object is corrected. In step S310, if the rectangle which includes the area of the object and whose four sides are parallel to the four sides of the platen image respectively and area is minimal is determined as the area of the document, the inclination of area of the document is not corrected.

In the flow chart in FIG. 3, although the processing for comparing the edge and for determining the area is performed in step S305 before the inclination is determined in step S307, those may be determined in a reverse order. The order of determination of size of the object in step S306 is not limited to that in the flow chart in FIG. 3. If the pixel group constituting the edge of the minimum rectangular area includes a larger number of pixels constituting the edge of the platen image or if the inclination is smaller than a predetermined angle, a method for determining the minimum rectangular area as the area of the document may be used.

If the area of the object is smaller than the predetermined size, a method for determining the area of the object as the area of the document may be used. Although an example in which pixels on the outermost periphery of the area are used as the pixel group constituting the edge of the area is given, not only pixels on the outermost periphery, but also pixels on the periphery having a width to some extent may be used.

The computer of the external information processing apparatus CT1 carries out the image processing method by reading a program code recorded on a recording medium to execute the program. In an apparatus in which the image reading apparatus is integrated with the image processing apparatus, the above image processing method may be carried out by the image processing apparatus.

While the present invention has been described with reference to exemplary embodiments, it is to be understood that the invention is not limited to the disclosed exemplary embodiments. The scope of the following claims is to be accorded the broadest interpretation to encompass all modifications, equivalent structures, and functions.

This application claims priority from Japanese Patent Application No. 2010-162097 filed Jul. 16, 2010, which is hereby incorporated by reference herein in its entirety.

What is claimed is:

1. A method comprising:

acquiring a read image corresponding to an original plate on which an original is placed, the read image being generated by reading of the original plate by a reading apparatus;

detecting an object area corresponding to an object included in the read image acquired by the acquiring, and inclination of the object area with respect to the read image;

determining a minimum rectangular area which includes the object area detected by the detecting, and is surrounded with four sides parallel to four sides of the read image respectively;

specifying a pixel group included in the four sides of the minimum rectangular area determined by the determining, the pixel group constituting an edge including in the read image; and determining the minimum rectangular area as an area of the original if the pixel group specified by the specifying includes a larger number of pixels than a predetermined number or if the inclination is smaller than a predetermined inclination, wherein the inclination is detected by rotating a circumscribed rectangle which is circumscribed by the object area, and an inclination of the rotated circumscribed rectangle of which a size is smaller than a predetermined size, is detected as the inclination of the object area.

2. The method according to claim 1 further comprising determining the object area as the area of the original if the object area is smaller than a predetermined object size.

3. The method according to claim 1 further comprising:

correcting, if the minimum rectangular area is not determined as the area of the original, the inclination of the image in the object area according to the detected inclination.

4. The method according to claim 1, further comprising:

specifying a pixel group included in sides of the object area, the pixel group constituting an edge included in the read image;

wherein the predetermined number is based on a number of pixels included in the specified pixel group.

5. The method according to claim 1, wherein the circumscribed rectangle is rotated to a plurality of angles, and the size of a first circumscribed rectangle of the circumscribed rectangle corresponding to a first angle is the predetermined size, and inclination of a second circumscribed rectangle of the circumscribed rectangle corresponding to a second angle, of which a size is smaller than the predetermined size is detected.

6. The method according to claim 5, wherein an inclination of the circumscribed rectangle which became the minimum size when the circumscribed rectangle is rotated to a plurality of angles is detected.

7. The method according to claim 1, wherein the method is executed by a device different from the reading apparatus.

8. The method according to claim 1, wherein the method is executed by the reading apparatus.

9. A non-transitory computer readable medium storing a computer-executable program of instructions for causing a computer to perform the method according to claim 1.

10. The non-transitory computer readable medium according to claim 9, wherein the method further comprises determining the object area as the area of the original if the object area is smaller than a predetermined object size.

11. The non-transitory computer readable storage medium according to claim 9, wherein the method further comprises:

correcting, if the minimum rectangular area is not determined as the area of the original, the inclination of the image in the object area according to the detected inclination.

12. An apparatus comprising:

an image processing unit configured to execute the method according to claim 1.

13. The apparatus according to claim 12, wherein the method further comprises determining the object area as the area of the original if the object area is smaller than a predetermined object size.

14. The apparatus according to claim 12, wherein the method further comprises:

correcting, if the minimum rectangular area is not determined as the area of the original, the inclination of the image in the object area according to the detected inclination.

15. The apparatus according to claim 12, wherein the method further comprising specifying a pixel group included in sides of the object area, the pixel group constituting an edge included in the read image;

wherein the predetermined number is based on a number of pixels included in the specified pixel group.

16. The apparatus according to claim 12, wherein the circumscribed rectangle is rotated to a plurality of angles, and the size of a first circumscribed rectangle corresponding to a first angle is the predetermined size, and inclination of a second circumscribed rectangle of which a size is smaller than the predetermined size corresponding to a second angle is detected.

17. The apparatus according to claim 16, wherein an inclination of the circumscribed rectangle which became the minimum size when the circumscribed rectangle is rotated to a plurality of angles is detected.

18. The apparatus according to claim 12, wherein the reading apparatus is different from the apparatus according to claim 12, and the image processing unit, which is different from the apparatus according to claim 12, is configured to acquire the read image from the reading apparatus.

19. The apparatus according to claim 12, further comprising a reading apparatus.

* * * * *